(No Model.)
A. RITSCHER.
DRIVE CHAIN.
No. 514,774.  Patented Feb. 13, 1894.
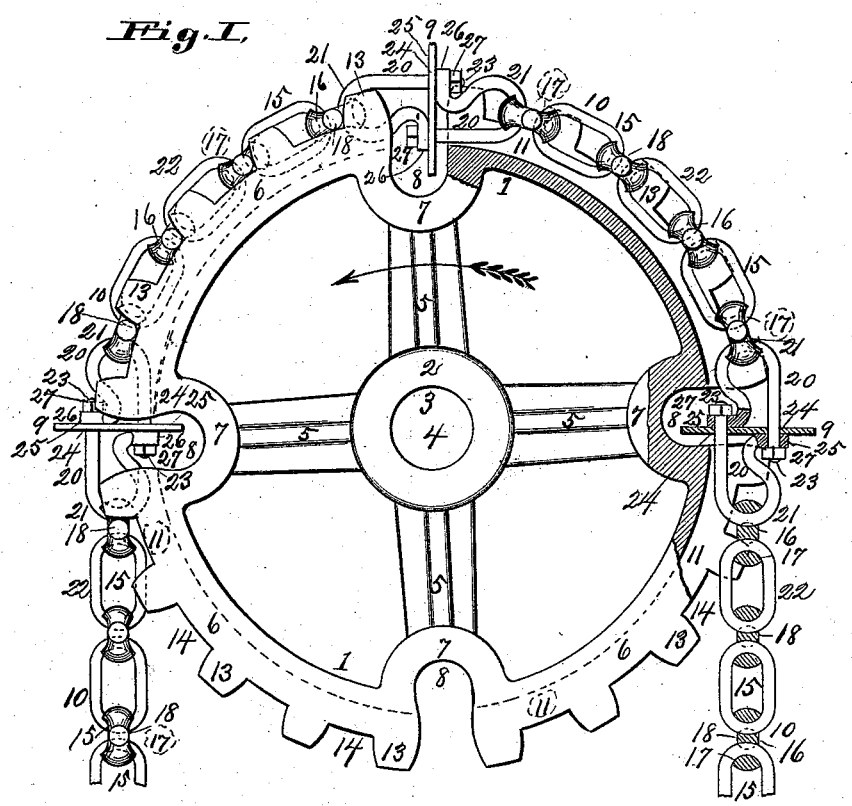
Attest:
Benj. A. Knight.
Albert M. Ebersole.
Inventor:
Adam Ritscher.
By Knight Bro's.
Attys.

UNITED STATES PATENT OFFICE.

ADAM RITSCHER, OF TAYLORVILLE, ILLINOIS.

DRIVE-CHAIN.

SPECIFICATION forming part of Letters Patent No. 514,774, dated February 13, 1894.

Application filed February 23, 1893. Serial No. 463,330. (No model.)

*To all whom it may concern:*

Be it known that I, ADAM RITSCHER, of Taylorville, in the county of Christian and State of Illinois, have invented a certain new and useful Improvement in Drive-Chains, of which the following is a full, clear, and exact description, reference being had to the accompanying drawings, forming part of this specification.

This invention relates to a system of detachable links for drive chains of conveyers or elevators, the individual, primary links of which are united together by intermediate, secondary coupling-links of a peculiar construction, with duplex, curvilinear link engagement bores to facilitate and strengthen the working power of the links of said chain, and to lie within the intermediate lock beds between the cogs of the conveyer or elevator wheel or wheels, and said secondary coupling links having laterally projecting integral lock-lugs, that constitute a direct lock catch of each succeeding double cog presentation of said conveyer or elevator wheel or wheels; the said sections of chain being secured together to form an endless conveyer or elevator chain by duplex hooks, that engage in certain of said curvilinear bores of said coupling links, and the screw tips of which respective duplex hooks pass through perforations in reinforce brace plates or flights and through the lug ends of the companion hooks, where they are secured by screw nuts, and the invention consists in features of novelty hereinafter fully described and pointed out in the claims.

Figure I is an elevation of the conveyer and elevator wheel, and chain, and shows the primary links and the secondary coupling links, provided with duplex, curvilinear bed bores for seating said primary links, the duplex hook and reinforce brace-plate flight attachment that also constitutes the chain section attachment, and the flight pockets in said wheel, with part of one side of the wheel broken away, to show the bed seat of the chain and the rear members of the duplex parallel cogs. Fig. II is an enlarged, horizontal, detail section, taken on line II—II, Fig. III, and shows the duplex parallel cogs of the wheel, the primary links and the secondary coupling links having duplex, curvilinear bores in which the primary links engage, and integral lock bolts that extend laterally from said coupling links and lock the hold of the chain to the wheel. Fig. III is an enlarged, vertical, detail section, taken on line III—III, Fig. II, and shows the wheel with its parallel duplex cogs, the curved bed seat in the cogs and felly of said wheel for said coupling link bed, the integral lock-bolts that extend laterally from the coupling link locked against said parallel cogs, and shows in broken lines the end limit of the curvilinear bores in which the primary link is fitted and seated. Figs. IV and V are enlarged, detail, respective top and side views of a modification, in which the integral, lateral lock bolts of the coupling links are dispensed with.

Referring to the drawings:—1 represents the combined conveyer and elevator wheel, which is alike used in horizontal, inclined and vertical drifts, and either as a primary drive or a secondary driven wheel, as the case may be. The said wheel is preferably cast integral, but may be of wrought metal construction.

2 represents the hub of said wheel, 3 its axle mount bore, 4 the axle in said bore on which said wheel is mounted, 5 the cross arms or spokes, and 6 the felly.

7 represents incurvations of the felly at its points of spoke connection, and 8 are deeply recessed pockets, within said incurvations, in which the plates 9 of the chain 10 find free access, as said chain rides said wheel.

11 represents a deep, circumferential recess or counter sink bed all around within said felly, within which countersink said chain works. 12 is a curvilinear, lateral extension, of said countersink bed, the use of which will soon appear, and 13 are duplex parallel cogs between which said chain works and against which it locks, while embedded in the recesses 14 between said cogs.

15 represents the primary links of said chain 10, which links are connected together by the novel coupling and approximately solid secondary links 16. The said coupling links are provided with duplex, curvilinear bores 17, in which bores respectively the adjacent primary links are freely and at the same time snugly bedded, so as to secure them from kinking, by any vibration or eccentric divergence from any cause in the movement of the chain. The movement of said chain and of all its individual links, is held much more uniform, and a saving of power is thus gained by the reduction of friction and by said uniformity of movement of its several parts. 28 are fore and aft, longitudinal extensions of said coupling links, that allow further extensions of the curvilinear link bed seats 17, also strengthen the coupling and add to its wearing capacity.

18 represents integral lock bolts that project laterally from the sides of the coupling secondary links, and as the chain progresses in its ride over the wheel, the said laterally projecting bolts of said coupling links engage with and lock against said duplex cogs of the wheel.

During all the time of the contact revolution or semi-revolution of the chain on the wheel, the bulge body 19 of the coupling secondary links, snugly embed themselves in the curvilinear, lateral extension 12 of the circumferential recess 11 of said combined conveyer and elevator wheel 1.

20 represents duplex hooks, the center loops 21 of which are respectively seated in the terminal, curvilinear bore of the outer end of the end coupling link of each section 22 of the chain, and the respective screw tip 23 of each of said duplex hooks passes through its respective perforate seat 24 in the reinforce brace plate or flight 9, and through the attachment eyelet 25 of the shank or holder lug 26, of its twin hook. The said respective, duplex hooks are mutually thus held to each other and to said plate, by the respective screw nuts 27 that engage on said screw tips 23 of said respective duplex hooks.

In the passage of the chain in its semi-circuit around the wheel, the inward projections of those portions of the plates that project beyond the inner circuit line of said chain belt, find a ready entrance into the deeply recessed pockets 8 of the wheel 1, the said plate attachments are located at co-incident lengths along said chain in agreement with the distance apart of said pockets in the felly of the wheel.

16' represents a modification of my coupling, secondary link, which is similar to my preferred form 16 of said link with the exception that the integral lock bolts 18 are dispensed with.

The co-operation of the various elements of my invention have been in a large measure pointed out in the course of introduction of said several parts. The novel coupling secondary links 16, combine two especial elements that secure the steady working of the chain, with only a minimum of friction by means of the duplex, curvilinear bores that seat the primary links, and thus prevent all kinking and trembling, frictional movement of the same; and also by the engagement of its integral projecting bolts 18, with the duplex, parallel cogs 13, a positive, (and not merely a friction) lock is secured. And the duplex hook attachment plates, make novel, strong and easy of attachment devices for coupling together the sections of the chain and said plates, and with the recessed pockets 8 in the wheel in which they in rotation bed themselves, they, too, add another element to the positive lock. Also the duplex cog arrangement of the wheel, with the curvilinear countersink in its felly in which the bulge 19 of the coupling secondary link and its fore and aft extensions 28 are bedded, conduces to the steadiness of the movement of the chain and in consequence to the ease with which it works, and the consequent reduction to a minimum of its wear and tear.

I claim as my invention—

1. A drive-chain comprising the primary links 15, and the secondary coupling links 16, provided with the duplex, curvilinear bores 17, in which said primary links are seated and having the laterally projecting lock lugs 18; substantially as described.

2. A drive-chain comprising the primary links 15, the secondary coupling links 16, provided with the duplex, curvilinear bores 17, in which said primary links are seated and having the laterally projecting lock lugs 18, and the duplex hooks 20, that hook into certain of the curvilinear bores of the coupling links; substantially as described.

3. A drive-chain comprising the primary links 15, the secondary coupling links 16, provided with the duplex, curvilinear bores 17, in which the said primary links are seated and held from irregular kink movements and having the laterally projecting lock lugs 18, the duplex hooks 20, that engage in certain of the curvilinear bores of the coupling links, having the perforate holder lugs 26, and the screw tips 23, passing through the perforations of the companion hooks and the screw lock nuts; substantially as described.

4. A drive chain comprising the primary links 15, the secondary coupling links 16, provided with the duplex, curvilinear bores 17, in which said primary links are seated, and held from irregular kink movements, and having the laterally projecting lock lugs, the bulge body 19 and the fore and aft extensions 28, the duplex hooks 20, that engage in certain of the curvilinear bores of the coupling links having the perforate holder lugs 26, and the screw tips 23, and the screw lock nuts 27; substantially as described.

5. A drive-chain comprising the primary links 15, the secondary links 16 provided with the duplex curvilinear bores 17 in which the primary links are seated and held from irregular kink movements, the duplex hooks 20, that engage in certain of the bores, having the perforate flat flanged holder lugs 26, and the screw tips 23 passing through the lugs of the companion hooks, and the nuts 27 mounted on said tips, substantially as described.

ADAM RITSCHER.

In presence of—
BENJN. A. KNIGHT,
ALBERT M. EBERSOLE.